United States Patent
Oyamada et al.

(10) Patent No.: US 11,066,484 B2
(45) Date of Patent: Jul. 20, 2021

(54) CELLULOSE ACETATE AND METHOD FOR PRODUCING CELLULOSE ACETATE

(71) Applicant: DAICEL CORPORATION, Osaka (JP)

(72) Inventors: Naohiro Oyamada, Himeji (JP); Akihiro Higuchi, Himeji (JP)

(73) Assignee: DAICEL CORPORATION, Osaka (JP)

( * ) Notice: Subject to any disclaimer, the term of this patent is extended or adjusted under 35 U.S.C. 154(b) by 237 days.

(21) Appl. No.: 16/067,904

(22) PCT Filed: Jan. 12, 2016

(86) PCT No.: PCT/JP2016/000117
§ 371 (c)(1),
(2) Date: Jul. 3, 2018

(87) PCT Pub. No.: WO2017/122228
PCT Pub. Date: Jul. 20, 2017

(65) Prior Publication Data
US 2020/0262933 A1 Aug. 20, 2020

(51) Int. Cl.
*C08B 3/06* (2006.01)
(52) U.S. Cl.
CPC ..................... *C08B 3/06* (2013.01)
(58) Field of Classification Search
CPC .................. C08B 3/06; C08L 1/14; C08L 1/12
See application file for complete search history.

(56) References Cited

U.S. PATENT DOCUMENTS

| 5,989,426 A | 11/1999 | Hirose et al. |
| 6,627,750 B2 * | 9/2003 | Wang .................. A61L 24/0042 428/364 |
| 8,133,990 B2 * | 3/2012 | Higuchi .................... C08B 3/06 536/69 |
| 2009/0171079 A1 * | 7/2009 | Higuchi .................... C08B 3/06 536/76 |
| 2013/0140236 A1 | 6/2013 | Tokimi et al. |

FOREIGN PATENT DOCUMENTS

| JP | 9-19630 A | 1/1997 |
| JP | 2012-115835 A | 6/2012 |

OTHER PUBLICATIONS

International Search Report, issued in PCT/JP2016/000117, dated Mar. 1, 2016.
Written Opinion of the International Searching Authority, issued in PCT/JP2016/000117, dated Mar. 1, 2016.

\* cited by examiner

*Primary Examiner* — Pancham Bakshi
(74) *Attorney, Agent, or Firm* — Birch, Stewart, Kolasch & Birch, LLP.

(57) ABSTRACT

Provided is cellulose acetate with which a hollow fiber membrane having excellent salt rejection and water permeability can be produced. The cellulose acetate, in which a total content of calcium and magnesium is 2.8 to 3.5 µmol/g; a 6 percent viscosity is 40 to 80 mPa·s; a degree of filtration Kw is 35 $g^{-1}$ or less; a molecular weight distribution Mw/Mn is 3.00 or less; and a degree of acetylation is 61.3 to 62.3%.

6 Claims, No Drawings

CELLULOSE ACETATE AND METHOD FOR PRODUCING CELLULOSE ACETATE

TECHNICAL FIELD

The present invention relates to cellulose acetate and a method for producing cellulose acetate.

BACKGROUND ART

Generally, in a method for producing cellulose acetate, pulp or the like, which is a cellulose material, is crushed and subjected to a pretreatment step in which acetic acid with or without a sulfuric acid catalyst is added and then cooled acetic acid, acetic anhydride, and sulfuric acid catalyst are added thereto, so that acetylation is carried out while controlling the temperature with an external jacket in a kneader. After obtaining a fully trisubstituted cellulose acetate (primary cellulose acetate) by acetylation, a neutralizing agent such as an aqueous magnesium acetate solution is added to neutralize sulfuric acid (completely neutralized or partially neutralized) with magnesium acetate, and the acetic anhydride is deactivated by moisture contained in the aqueous magnesium acetate solution. Then, a viscous primary cellulose acetate dope is dropped into an aging tank and hydrolyzed to obtain cellulose acetate having a desired degree of substitution. A large amount of non-solvent (water, diluted aqueous acetic acid solution, etc.) is added to this cellulose acetate (secondary cellulose acetate) to precipitate cellulose acetate. The precipitated cellulose acetate is subjected to solid-liquid separation, washed, and dried to obtain a flaky cellulose acetate.

One of applications of the cellulose acetate thus obtained is to use cellulose acetate as a hollow fiber membrane, which is modularized to serve as a reverse osmosis membrane (RO membrane) or a forward osmosis membrane (FO membranes) for desalinating seawater. When desalinating seawater with the hollow fiber membranes of the seawater desalination module as described above, it is necessary to apply a pressure to the sea water at the time of filtration, so that its water permeability is required.

In the conventional hollow fiber membrane, water permeability is improved by making the dense layer thin and making the support layer asymmetric (Patent Literature 1). In addition, a flat membrane type composite reverse osmosis membrane having an active layer (thin film, skin layer) mainly composed of polyamide and having both of high salt suppression and high permeability is described (Patent Literature 2).

CITATION LIST

Patent Literature

PTL 1: JP-A-2012-115835
PTL 2: JP-A-9-019630

SUMMARY OF INVENTION

Technical Problem

An object of the present invention is to provide cellulose acetate capable of producing a hollow fiber membrane having excellent salt rejection and water permeability.

Solution to Problem

The first aspect of the present invention relates to cellulose acetate, in which a total content of calcium and magnesium is 2.8 to 3.5 µmol/g, a 6 percent viscosity is 40 to 80 mPa·s, a degree of filtration Kw is 35 $g^{-1}$ or less, and a molecular weight distribution Mw/Mn is 3.00 or less, and a degree of acetylation is 61.3 to 62.3%.

The degree of filtration Kw is preferably 30 $g^{-1}$ or less.

A calcium content is preferably 80 to 200 ppm.

A half-value width of composition distribution is preferably 1.0% or less.

A 6-position substitution degree is preferably 0.92 or more.

A total sulfuric acid concentration is preferably 40 to 150 ppm.

The second aspect of the present invention is a method for producing cellulose acetate, including the steps of:

crushing a pulp having a carboxyl group content of 1.0 meq/100 g or more;

pretreating the crushed pulp by bringing the pulp into contact with acetic acid or a sulfur-containing acetic acid;

bringing the pretreated pulp into contact with a mixed solution of acetic acid and acetic anhydride to esterify the pulp with acetic anhydride;

adding a neutralizing agent to hydrolyze the cellulose acetate obtained by the esterification;

precipitating the cellulose acetate whose degree of acetyl substitution is adjusted by the hydrolysis; and adding a stabilizer to the precipitated cellulose acetate;

in which the mixed solution is in a state between 10° C. below freezing and 3° C. below freezing, and in the esterification step, a temperature of a reaction system reaches a peak temperature between 48° C. and 55° C. by less than 50 minutes after the pretreated pulp is brought into contact with the mixed solution of acetic acid and acetic anhydride, and the temperature of the reaction system drops by 5° C. from the peak temperature by less than 70 minutes from the above point reaching the peak temperature.

Advantageous Effects of Invention

Using the cellulose acetate of the present invention or the cellulose acetate obtained by the method for producing cellulose acetate of the present invention, a hollow fiber membrane having excellent salt rejection and water permeability can be produced.

DESCRIPTION OF EMBODIMENTS

Since cellulose acetate itself in RO membranes and FO membranes made of cellulose acetate as a material is resistant to chlorine, such RO and FO membranes make it easy to carry out chlorine sterilization, so that these membranes are useful in desalination treatment of sea water such as the Red Sea in the Middle East where microorganisms are likely to propagate at high temperature and high concentration. However, with cellulose acetate, it is difficult to maintain both water permeability and salt rejection performance at a high level. When the water permeability is not at a high level, the permeability can be increased by increasing the pressure at the time of filtration, but increasing the pressure raises the water production cost. Incidentally, the high pressure means, for example, a separating operation pressure of 5 MPa or more. In addition, RO membranes or FO membranes having an active layer (thin film, skin layer) mainly composed of polyamide has a problem of chlorine resistance.

According to the present disclosure, it is possible to provide a cellulose acetate capable of producing a hollow fiber membrane having both excellent chlorine resistance and water permeability.

Hereinafter, an example of a preferred embodiment will be specifically described.

The cellulose acetate of the present disclosure has a total content of calcium and magnesium of 2.8 to 3.5 μmol/g, a 6 percent viscosity of 40 to 80 mPa·s, a degree of filtration Kw of 35 g$^{-1}$ or less, a molecular weight distribution Mw/Mn of 3.00 or less, and a degree of acetylation of 61.3 to 62.3%.

[Calcium Content and Magnesium Content]

The calcium and magnesium contained in the cellulose acetate of the present disclosure are mostly derived from a neutralizing agent, a stabilizer or washing water used at the time of producing cellulose acetate, and are present, for example, in a state of adhesion to the surface of cellulose acetate flake or due to electrostatic interaction with the carboxyl group contained in the cellulose fiber or the sulfate ester moiety formed during production.

In the cellulose acetate according to the present disclosure, the total content of calcium and magnesium is 2.8 to 3.5 μmol/g, preferably 2.9 to 3.4 μmol/g, more preferably 3.0 to 3.2 μmol/g. When the total content of calcium and magnesium is less than 2.8 μmol/g, the salt rejection becomes insufficient especially when used for a hollow fiber membrane, whereas when the total content of calcium and magnesium exceeds 3.5 μmol/g, yarn breakage tends to increase during the formation of hollow fiber membranes when the hollow fiber membrane is produced, making it difficult to form a film.

The cellulose acetate according to the present disclosure preferably has a calcium content of 80 to 200 ppm, more preferably 90 to 170 ppm, and even more preferably 100 to 140 ppm. When the calcium content is within the above range, it is possible to obtain a hollow fiber membrane with high performance, such as excellent salt rejection and water permeability while maintaining solubility.

The calcium content and magnesium content of cellulose acetate can be measured by the following methods, respectively.

Undried sample of 3.0 g is placed in a crucible and weighed, carbonized on an electric heater, and ached in an electric furnace at 750 to 850° C. for about 2 hours. After cooling for about 30 minutes, 25 mL of 0.07% hydrochloric acid solution was added thereto and the ash is dissolved by heating at 220 to 230° C. After leaving to stand for cooling, the solution is diluted in a measuring cylinder to 200 mL with distilled water, and using this as a test solution, absorbance is measured together with a standard solution by an atomic absorption photometer, and the calcium (Ca) content or the magnesium (Mg) content of the test solution is determined and the content of calcium (Ca) or magnesium (Mg) in the sample can be obtained by conversion by the following formula. The moisture content in the sample can be measured using, for example, a Kett moisture tester (METTLER TOLEDO HB 43). Approximately 2.0 g of a sample in a hydrated state is placed on an aluminum tray of the Kett moisture tester and heated at 120° C. until the weight does not change, whereby moisture (% by weight) in the sample can be calculated from the weight change before and after heating.

$$\text{Ca or Mg content of sample (ppm)} = \frac{\text{Ca or Mg content of test liquid (ppm)} \times 200}{\text{Weight of sample (g)} \times (1-\text{Moisture (\% by weight)}/100)}$$ [Equation 1]

The total content of calcium and magnesium can be calculated using each atomic weight Ca: 40.1 g/mol and Mg: 24.3 g/mol.

[6 Percent Viscosity]

The 6 percent viscosity is the viscosity measured using an Ostwald viscometer of a 6 wt/vol % solution in which 3.00 g of a dried sample was dissolved in 61.67 g of a mixed solution of dichloromethane/methanol=91/9.

The cellulose acetate according to the present disclosure has a 6 percent viscosity of 40 to 80 mPa·s, preferably 45 to 70 mPa·s, and more preferably 50 to 60 mPa·s. When the 6 percent viscosity is less than 40 mPa s, there is a case that the hollow fiber does not have sufficient pressure resistance when passing water, especially when used for hollow fiber membranes. Also, when the 6 percent viscosity exceeds 80 mPa·s, sufficient water permeability may not be obtained particularly when used for hollow fiber membranes.

Here, details of the method for measuring the 6 percent viscosity are as follows. In an Erlenmeyer flask, 3.00 g of a dried sample and 61.67 g of a mixed solution of dichloromethane/methanol=91/9 are placed, sealed tightly, and stirred for about 1 hour. Then the mixture is shaken for about 1.5 hours on a rotary shaker to completely dissolve it. The obtained 6 wt/vol % solution is transferred to a predetermined Ostwald viscometer up to the marking line and the temperature is adjusted at 25±1° C. for about 30 minutes. The flow-down time between the time marking lines can be measured and the 6 percent viscosity can be calculated from the following equation:

6% Viscosity (mPa·s)=Flow-down time (s)×Viscometer coefficient

Here, the viscometer coefficient was obtained from the following equation by measuring the flow-down time by the same operation as above using the viscometer calibration standard solution [manufactured by Showa Oil Co., Ltd. under the trade name "JS-200" (in conformity with JIS Z 8809)].

Viscometer coefficient={Absolute viscosity of standard solution (mPa·s)×Density of solution (0.827 g/cm$^3$)}/{Density of standard solution (g/cm$^3$)×Flow-down seconds of standard solution (s)}

[Degree of Filtration Kw]

The degree of filtration is the degree of clogging on a predetermined filter cloth. The degree of filtration Kw of the cellulose acetate of the present disclosure is 35 g$^{-1}$ or less, preferably 30 g$^{-1}$ or less, more preferably 20 g$^{-1}$ or less. When the degree of filtration Kw exceeds 35 g$^{-1}$, yarn breakage during the formation of hollow fiber membranes increases, making film formation difficult particularly when used for a hollow fiber membrane.

The degree of filtration Kw can be measured by the following method. After preparing a sample of particles passing through a 2 mm mesh and not passing through a 1 mm mesh and drying it, 56.8 g of the sample is placed in a 500 mL-vessel for dissolution, and 30 g of methanol is added thereto. Then 268 g of methylene chloride is added to the mixture, and dissolution is started by rotating the container at a speed of 2 rpm. After 6 hours from the time of starting dissolution, the solution is filtered using a sintered filter (filtration particle size 15 μm), diameter 10 mm, filtration area 0.79 cm², at a temperature of 25° C. under a pressure of 3 kg/cm². At this time, the filtration quantity up to 20 minutes after the start of filtration is measured as $P_1$ (g), the filtration quantity from 20 minutes to 60 minutes as $P_2$ (g), and the degree of filtration Kw (g$^{-1}$) is calculated by the following equation.

$$\text{Degree of filtration Kw (g}^{-1}) = \frac{2 - P_2/P_1}{P_1 + P_2} \times 10^4 \qquad \text{[Equation 2]}$$

[Molecular Weight Distribution Mw/Mn]

The molecular weight distribution (molecular weight distribution Mw/Mn obtained by dividing weight average molecular weight Mw by number average molecular weight Mn) of the cellulose acetate of the present disclosure is 3.00 or less, preferably 2.90 or less. The lower limit value is not particularly limited but is preferably 1.0 or more. When the molecular weight distribution Mw/Mn exceeds 3.00, sufficient water permeability may not be obtained in some cases.

The molecular weight distribution Mw/Mn can be measured by the following method. A high-performance liquid chromatography system in which a detector for detecting refractive index and light scattering is connected to a gel filtration column can be used. For example, Shodex GPC SYSTEM-21H can be used as a high-performance liquid chromatography system. As the detector, for example, a differential refractive index detector (RI) can be used. Measurement conditions of such gel permeation chromatography are as follows.

Solvent: dichloromethane
Column: TSK gel GMH$_{XL}$ (7.8×300 mm) two columns
Guard column: TSK gel guard column H$_{XL}$-H
Sample concentration: 2000 ppm
Flow rate: 0.8 mL/min
Sample injection amount: 100 μL
Standard sample: PMMA (molecular weights 1850, 7360, 29960, 79500, 201800, 509000, 625500)
Column temperature: 28° C.

Both weight average molecular weight (Mw) and number average molecular weight (Mn) are measured under the same measurement conditions as above. The molecular weight distribution can be calculated from the weight average molecular weight and the number average molecular weight obtained from the measurement results according to the following equation:

Molecular weight distribution=*Mw/Mn* wherein Mw is weight average molecular weight and Mn is number average molecular weight.

[Degree of Acetylation]

The average degree of acetylation of the cellulose acetate of the present disclosure is 61.3 to 62.3%, preferably 61.4 to 62.0%, more preferably 61.6 to 61.8%. When the average degree of acetylation is less than 61.3%, particularly when used for hollow fiber membranes, decomposition by microorganisms is accelerated and hollow fiber life is liable to be shortened. When the average degree of acetylation exceeds 62.3%, particularly when used for hollow fiber membranes, the solubility in the dissolving step before the film formation tends to be deteriorated.

The degree of acetylation is measured according to the measurement of degree of acetylation and calculation method described in ASTM: D-817-91 (test method of cellulose acetate etc.).

[Half Value Width of Composition Distribution]

In the cellulose acetate of the present disclosure, the half-value width of composition distribution means the chart width at half the height of the chart peak when the degree of acetylation is on the horizontal axis (x axis) and the abundance at this degree of acetylation is on the vertical axis (y axis), which is an index indicating a measure of distribution variation.

The half-value width of composition distribution of the cellulose acetate according to the present disclosure is not particularly limited, but it is preferably 1.0% or less, more preferably 0.98% or less, even more preferably 0.95%. The lower limit value is not particularly limited but is preferably 0.80% or more. When the half-value width of composition distribution is 1.0% or less, phase separation can be uniformly carried out at the time of coagulation of the cellulose acetate dope in the process of forming a film of the hollow fiber, so that partly fragile parts are hardly generated in the hollow fiber to keep the salt rejection performance high.

The half-value width of composition distribution can be measured by the following method.

High-performance liquid chromatography (HPLC) analysis is used for the determination of such a half-value width. That is, a plurality of cellulose esters having different degree of acetylation are used as standard samples, subjected to HPLC analysis under a predetermined measuring apparatus and measurement conditions, and from a calibration curve [a curve showing the relationship between the amount of cellulose ester present and the degree of acetylation, usually a quadratic curve (especially a parabola)] prepared using analysis values of these standard samples, the half-value width of composition distribution can be obtained. As a high-performance liquid chromatography system, for example, Agilent 1100 Series can be used. As the detector, for example, Varian 380-LC can be used. Measurement conditions for such high-performance liquid chromatography are as follows.

Solvent 1: methanol/water=8/1 (vol/vol)
Solvent 2: chloroform/methanol=9/1 (vol/vol)
Start from the condition of Solvent 1/Solvent 2=8/2 and gradually change to a composition of solvent 1/solvent 2=0/10 over 28 minutes. Elution is then carried out under the same conditions for 8 minutes.
Column: Waters Nova-Pak Phenyl 60 Å4 μm (150 mm×3.9 mmφ)
Guard column: Waters Nova-Pak Phenyl 4 μm
Sample concentration: 1000 ppm
Flow rate: 0.7 mL/min
Sample injection amount: 15 μL
Standard sample: multiple cellulose esters each having a different degree of acetylation
Column temperature: 30° C.

More specifically, the half-value width of composition distribution can be obtained by converting the horizontal axis (elution time) of the dissolution curve of cellulose acetate in HPLC (reversed phase HPLC) measured under predetermined treatment conditions to the degree of acetylation.

As a method for converting an elution time into the degree of substitution, for example, the elution time is measured under the same measurement conditions using a plurality (for example, four or more) of samples with a different degree of substitution, and a conversion formula (conversion expression) for obtaining the degree of acetylation from the elution time (T) may be obtained. That is, a function (usually, the following quadratic equation) of a calibration curve is obtained by the least squares method from the relationship between elution time (T) and degree of acetylation.

$$\text{Degree of acetylation} = aT^2 + bT + c$$

(In the formula, T is the elution time, and a, b, and c are each a coefficient of the conversion expression)

Then, in the distribution curve of the degree of acetylation (the distribution curve of the degree of substitution defined the amount of cellulose acetate as vertical axis and the degree of acetylation as horizontal axis) obtained by the conversion formula as described above, the half-value width of composition distribution is determined below with respect to the maximum peak (E) corresponding to the observed average degree of substitution. That is, the baseline (A-B) in contact with the base (A) on the low substitution side of the peak (E) and the base (B) on the high substitution side is drawn and a perpendicular line to this baseline is drawn to the horizontal axis from the maximum peak (E). The intersection point (C) between the perpendicular line and the baseline (A-B) is determined and the midpoint (D) between the maximum peak (E) and the intersection (C) is determined. A straight line parallel to the baseline (A-B) through the midpoint (D) is drawn and the two intersection points (A', B') with the distribution curve of the degree of acetylation is obtained. A perpendicular line is drawn from the two intersection points (A', B') to the horizontal axis, and the width between the two intersection points on the horizontal axis is used as the half-value width of the maximum peak.

The half-value width of composition distribution as described above reflects that holding time (also called retention time) is different, depending on the degree of esterification of the hydroxyl groups of the glucose ring of each polymer chain constituting the molecular chain of the cellulose acetate in the sample. Therefore, ideally, the width of the retention time indicates the width of the composition distribution (in units of acetylation degree). However, there are pipe sections (such as guide columns for protecting the column) that do not contribute to the distribution in the high-performance liquid chromatograph. Therefore, depending on the configuration of the measuring apparatus, the range of retention time not attributable to the width of composition distribution is often included as an error. This error is influenced by the length of the column, the inner diameter, the length from the column to the detector, handling, etc., and varies depending on the configuration of the apparatus.

Therefore, the half-value width of composition distribution of the cellulose acetate can be usually determined as the corrected value Z, based on the correction formula represented by the following formula. Using such a correction formula, it is possible to obtain a more accurate half-value width of composition distribution at the same (nearly the same) value even if the measuring apparatus (and measurement conditions) is different.

$$Z = (X^2 - Y^2)^{1/2}$$

wherein X represents a half-value width (uncorrected value) of a composition distribution, determined in a predetermined measurement apparatus under predetermined measurement conditions, and Y represents a half-value width of composition distribution of the cellulose acetate in which all of the hydroxyl groups of cellulose are acetylated, the half-value width being determined in a predetermined measurement apparatus under predetermined measurement conditions as for X.

The cellulose acetate in which all of the hydroxyl groups of cellulose are acetylated (for example, cellulose triacetate having a degree of acetylation of 62.5%) corresponds to a completely substituted product without deacylation which is obtained after acylation of cellulose and before ripening. In fact (or ideally), such a cellulose is cellulose acetate having no half-value width of composition distribution (i.e., a half-value width of composition distribution of 0).

[6-Position Substitution Degree]

The 6-position substitution degree of the cellulose acetate according to the present disclosure is preferably 0.92 or more, more preferably 0.93 or more, even more preferably 0.94 or more. The upper limit value is not particularly limited but is preferably 0.98 or less. When the 6-position substitution degree is 0.92 or more, solubility in a spinning solvent such as N-methylpyrrolidone (NMP) or the like can be kept high, so that yarn breakage in the formation of hollow fiber membranes is reduced.

The 6-position substitution degree can be measured by the following method. The respective degrees of acetyl substitution at the 2-, 3-, and 6-positions on the glucose ring of cellulose acetate can be measured by NMR method according to the method of Tezuka (Tezuka, Carbonydr. Res. 273, 83 (1995)). That is, free hydroxy groups of cellulose acetate are propionylated with propionic anhydride in pyridine. The resulting sample is dissolved in deuterated chlorofoim, and $^{13}$C-NMR spectra are measured. Carbon signals of acetyl groups appear in the order from the 2-position, via the 3-position, to the 6-position from a higher magnetic field in a region from 169 ppm to 171 ppm, and carbonyl carbon signals of propionyl groups appear in the same order in a region from 172 ppm to 174 ppm. The respective degrees of acetyl substitutions at the 2-, 3-, and 6-positions on the glucose ring of the original cellulose acetate can be determined from the abundance ratios between acetyl and propionyl groups at the corresponding positions. These degrees of acetyl substitution can also be determined by $^1$H-NMR, in addition to $^{13}$C-NMR.

[Total Sulfuric Acid Concentration]

The total sulfuric acid concentration of the cellulose acetate according to the present disclosure is preferably 40 to 150 ppm, more preferably 50 to 140 ppm, even more preferably 60 to 130 ppm. When the total sulfuric acid concentration is within the above range, a sufficient salt rejection can be obtained without impairing the stability to heat upon dissolution.

The total sulfuric acid concentration can be obtained by the following method. A dried cellulose ester is baked in an electric furnace at 1,300° C., sublimated sulfurous acid gas is trapped in 10% hydrogen peroxide water, titrated with a prescribed aqueous sodium hydroxide solution, and the amount converted as $SO_4^{2-}$ is measured as the total sulfuric acid amount. The total sulfuric acid concentration is expressed in ppm as the total sulfuric acid amount in 1 g of cellulose ester in an absolute dry state.

[Production of Cellulose Acetate]

The method for producing cellulose acetate will be described in detail. The cellulose acetate according to the present disclosure can be produced by undergoing a series of steps including crushing the pulp, pretreating the crushed pulp, esterifying the pretreated pulp, hydrolyzing the esterified pulp, precipitating the hydrolysed pulp, and adding a stabilizer to the precipitate. It should be noted that a general method for producing cellulose acetate can be found in the following publication: MIGITA et al., "Mokuzai Kagaku (Wood Chemistry)", Kyoritsu Publishing Company Inc., 1968, pp. 180 to 190.

(Pulp)

In the method for producing cellulose acetate of the present disclosure, the α-cellulose content of the pulp is preferably 98.0% by weight or more, more preferably 98.2% by weight or more, even more preferably 98.4% by weight or more. The upper limit value is not particularly limited. If the α-cellulose content of the pulp is less than 98.0% by weight, the amount of impurities in the cellulose acetate increases and the degree of filtration Kw increases, so that yarn breakage during the formation of hollow fiber membranes increases and film formation may be difficult in some cases.

The amount of carboxyl groups in the pulp is preferably 1.0 meq/100 g or more, more preferably 1.1 to 2.5 meq/100 g, even more preferably 1.2 to 1.6 meq/100 g. When the amount of carboxyl groups is less than 1.0 meq/100 g, the salt rejection and water permeability may be inferior, especially when the obtained cellulose acetate is used for a hollow fiber membrane. When the amount of carboxyl groups in the pulp exceeds 2.5 meq/100 g, the salt rejection and water permeability may also be inferior, especially when the obtained cellulose acetate is used for a hollow fiber membrane.

The amount of carboxyl groups in the pulp can be measured by various methods such as TAPPI Standard T237 om-83 and the like.

The moisture content of the pulp is preferably 5.0 to 9.0% by weight, more preferably 6.0 to 8.0% by weight, even more preferably 6.5 to 7.5% by weight. If the moisture content of the pulp is too low, the reactivity of the pulp deteriorates markedly. On the other hand, when the moisture content is too high, it is necessary to use excess acetic anhydride in the reaction, which is disadvantageous in terms of cost.

The moisture content can be measured by the following method. The moisture content of the pulp can be measured using, for example, a Kett moisture meter (METTLER TOLEDO HB 43). Approximately 2.0 g of a sample in a hydrated state is placed on an aluminum tray of Kett moisture meter and heated at 120° C. until the weight does not change, whereby moisture (% by weight) in the sample can be calculated from the weight change before and after the heating.

Wood pulp (coniferous pulp, hardwood pulp), cotton linter, and the like can be used as the pulp in the method for producing cellulose acetate of the present disclosure. These celluloses may be used singly or in combination of two or more kinds thereof. For example, coniferous pulp may be used in combination with cotton linter or hardwood pulp.

Since wood pulp has a preferable amount of carboxyl groups as described later in many cases, such a wood pulp is preferable because it is advantageous in terms of stable supply of raw materials and low cost as compared with the linters. The wood pulp includes, for example, hardwood prehydrolyzed kraft pulp and the like can be mentioned.

(Disintegration)

In the crushing step of the pulp, for example, the pulp in a dry state can be crushed in a disc refiner. Particularly, when it is difficult to handle in subsequent steps, such as when the pulp is supplied in the form of a sheet, it is preferable to undergo a step of crushing the pulp in a dry manner.

(Pretreatment)

In the pretreatment step, crushed pulp is brought into contact with acetic acid or a sulfur-containing acetic acid. As the acetic acid, a 96-100% by weight acetic acid can be used, and the sulfur-containing acetic acid is an acetic acid containing sulfuric acid and is preferably an acetic acid containing 1-10% by weight of sulfuric acid.

Acetic acid or a sulfur-containing acetic acid can be brought into contact with the pulp at a ratio of preferably 10 to 500 parts by weight with respect to 100 parts by weight of the pulp.

As a method for bringing the pulp into contact with acetic acid and/or a sulfur-containing acetic acid, for example, there are exemplified a method in which acetic acid and/or a sulfur-containing acetic acid is added in one step, or a method in which acetic acid or a sulfur-containing acetic acid is added by dividing into two or more stages, such as a method in which acetic acid is added and after a certain period of time, a sulfur-containing acetic acid is added or a method in which a sulfur-containing acetic acid is added and after a certain period of time, acetic acid is added, and the like. As a specific means for contacting, there may be mentioned a method for spraying acetic acid and/or a sulfur-containing acetic acid onto pulp and then stirring the sprayed pulp.

Acetic acid or a sulfur-containing acetic acid is preferably adjusted to 17 to 40° C. in advance, more preferably 20 to 40° C.

Then, after adding acetic acid and/or a sulfur-containing acetic acid to the pulp, the pretreatment is carried out by leaving the pulp, for example, at 17 to 40° C. for 0.2 to 48 hours, or by sealing and stirring the pulp at 17 to 40° C. for 0.1 to 24 hours, or the like.

(Esterification)

In the esterification step, the pretreated pulp is brought into contact with a mixed solution of acetic acid and acetic anhydride to esterify the pulp with acetic anhydride. The mixed solution preferably contains sulfuric acid. Esterification can be initiated by adding the pretreated pulp to the mixed solution or by adding the mixed solution and sulfuric acid to the pretreated pulp. In the esterification step, a 96 to 100% by weight acetic acid can be used as the acetic acid, and sulfuric acid is preferably a concentrated sulfuric acid.

In the case of preparing a mixed solution of acetic acid and acetic anhydride, there is no particular limitation as long as acetic acid and acetic anhydride are contained, but the ratio of acetic acid and acetic anhydride is preferably 200 to 400 parts by weight of acetic anhydride with respect to 300 to 600 parts by weight of acetic acid, more preferably 240 to 280 parts by weight of acetic anhydride with respect to 350 to 530 parts by weight of acetic acid.

As a ratio of pulp, mixed solution of acetic acid and acetic anhydride, and sulfuric acid in the esterification reaction, the mixed solution of acetic acid and acetic anhydride is preferably 500 to 1000 parts by weight and sulfuric acid is preferably 5 to 15 parts by weight, more preferably 7 to 13 parts by weight, even more preferably 8 to 11 parts by weight with respect to 100 parts by weight of the pulp.

Regarding the pulp, the temperature of the reaction system in the esterification reaction is mainly controlled by the temperature of acetic anhydride and acetic acid to be added. Since the esterification reaction is an exothermic reaction, the temperature of the reaction system is determined by the balance between the heat of fusion that absorbs heat when the added acetic anhydride melts and the reaction heat of esterification. Although it is possible to use a jacket that cools or warms the reactor externally, pulp is a solid and a primary cellulose is also a viscous fluid and has high heat capacity as well as high heat insulation, so that it is difficult to uniformly control the temperature. Therefore, it is preferable to control the reaction temperature of the esterification reaction by controlling the temperature of acetic anhydride and acetic acid to be added.

The mixed solution of acetic acid and acetic anhydride to be brought into contact with the pulp is preferably cooled beforehand from 10° C. below freezing to 3° C. below freezing before bringing it into contact with the pulp, more preferably 10° C. below freezing to 5° C. below freezing, even more preferably 9° C. below freezing to 7° C. below freezing. This is because as will be described later, it becomes easy to reach the peak temperature of the reaction system between 48° C. and 55° C. by less than 50 minutes from the point of contact of the pretreated pulp with the mixed solution of acetic acid and acetic anhydride.

In the esterification step, the temperature of the reaction system is made to reach a peak temperature between 48° C. and 55° C. by less than 50 minutes from the point of contact of the pretreated pulp with the mixed solution of acetic acid and acetic anhydride. Here, the peak temperature refers to the temperature at the time when the temperature rises the most in the esterification step and the peak time is the time to reach the peak temperature from the point of contact of the pretreated pulp with a mixed solution of acetic acid and acetic anhydride. Further, the temperature of the reaction system can be measured by a thermometer in the step.

Furthermore, in the esterification step, the temperature of the reaction system is dropped by 5° C. from the peak temperature by less than 70 minutes from the point of contact of the pretreated pulp with the mixed solution of acetic acid and acetic anhydride. According to the cellulose acetate thus obtained, when it is used for a hollow fiber membrane, there can be produced a hollow fiber membrane having excellent salt rejection and superior water permeability.

In the esterification step, it is preferable to provide a means for adjusting the temperature of the reaction system in the esterification step, such as running cold brine or the like into the jacket part of the device body. This makes it easier for the temperature of the reaction system to drop by 5° C. from the peak temperature by less than 70 minutes from the point of contact of the pretreated pulp with the mixed solution of acetic acid and acetic anhydride.

The esterification time is preferably from 90 to 280 minutes. Here, the "esterification time" means the time from the point of contact of the pretreated pulp with the mixed solution of acetic acid and acetic anhydride until the addition of the neutralizing agent.

(Hydrolysis)

In the hydrolysis step, a neutralizing agent is added to hydrolyze the cellulose acetate obtained by the esterification. A neutralizing agent such as water, a dilute acetic acid, or an aqueous magnesium acetate solution is added so that the esterification reaction is stopped to initiate hydrolysis.

In the case of using sulfuric acid in the esterification reaction, sulfuric acid bonded to cellulose as sulfuric acid ester by the esterification reaction is removed by saponification for improving a thermal stability.

In the case of using water as a neutralizing agent, it reacts with acetic anhydride present in the reaction mixture containing cellulose acetate to produce acetic acid, and water can be added so that the moisture content of the reaction mixture containing cellulose acetate after the hydrolysis step becomes 5 to 70 mol %. If the moisture content is less than 5 mol %, the hydrolysis reaction does not proceed and depolymerization proceeds to form cellulose acetate with low-viscosity. When the moisture content exceeds 70 mol %, cellulose acetate precipitates after completion of esterification reaction and exits from the hydrolysis reaction system, so that the hydrolysis reaction of the precipitated cellulose ester does not proceed.

Here, dilute acetic acid refers to that an aqueous acetic acid solution has a concentration of 1 to 50% by weight. In addition, an aqueous magnesium acetate solution preferably has a concentration of 5 to 30% by weight.

In addition, since sulfate esters cannot be removed efficiently when the sulfate ion concentration in the reaction mixture containing cellulose acetate is high, it is preferable to lower the sulfate ion concentration by forming an insoluble sulfate by adding an aqueous solution of an alkaline earth metal salt of acetic acid such as magnesium acetate or an acetic acid-water mixed solution. It is preferable to adjust the sulfate ion of the reaction mixture containing cellulose acetate to 1 to 6 parts by weight with respect to 100 parts by weight (in terms of cellulose) of cellulose acetate. Incidentally, for example, by adding an acetic acid-water mixed solution of magnesium acetate to a reaction mixture containing cellulose acetate, it is possible to simultaneously stop the esterification reaction and decrease the weight ratio of sulfate ions with respect to 100 parts by weight (in terms of cellulose) of cellulose acetate.

The hydrolysis time is not particularly limited, but when the average degree of acetylation is adjusted to 61.4 to 62.0%, for example, for 40 to 70 minutes. Here, the hydrolysis time is the time from the start of charging the neutralizing agent to the stop of the hydrolysis reaction.

The hydrolysis is carried out by maintaining the reaction system at a temperature of preferably 45 to 65° C., particularly preferably 50 to 60° C., for 40 to 70 minutes.

In the hydrolysis step, by utilizing the heat of reaction between water and acetic anhydride, the entire reaction system can be kept at a uniform and appropriate temperature, so that those having too high or too low average degree of acetylation are prevented from being generated.

(Precipitation)

The precipitation step precipitates cellulose acetate whose degree of acetyl substitution has been adjusted by the hydrolysis.

For example, a precipitate can be obtained by mixing a mixture containing cellulose acetate with a precipitating agent such as water, a dilute acetic acid, or an aqueous magnesium acetate solution and separating the produced cellulose acetate (precipitate). Here, water or a dilute acetic acid is preferable as a precipitating agent used for obtaining a precipitate of cellulose acetate. This is because the sulfate salt in the reaction mixture containing cellulose acetate is dissolved and the sulfate salt in the cellulose acetate powder obtained as a precipitate can be easily removed.

As a specific means for mixing the reaction mixture containing cellulose acetate and the precipitating agent, there is mentioned a method in which a reaction mixture containing cellulose acetate is extruded into a thread form having a diameter of about 1 to 5 mm, and the reaction mixture is brought into contact with a precipitating agent to solidify it, followed by stirring after shredding using a rotary cutter, or a method for adding a precipitating agent to a reaction mixture containing cellulose acetate and kneading the mixture with a twin-screw kneader, or the like.

(Addition of Stabilizer)

After precipitating the cellulose acetate, a stabilizer is added to the precipitated cellulose acetate. This is to increase the thermal stability of the cellulose acetate after the hydrolysis reaction (after complete neutralization). As a stabilizer, an alkali metal compound and/or an alkaline earth metal compound, particularly a calcium compound such as calcium hydroxide, is preferable.

The amount of stabilizer to be added varies depending on occasional operating conditions, but it is preferred, for example, to add a reaction mixture containing cellulose acetate and an aqueous calcium hydroxide solution adjusted to 0.2 to 1.0% at a volume ratio of 100:1 to 10.

The addition of the stabilizer may be carried out when removing the free metal component, sulfuric acid component or the like by washing the precipitate with water.

After the step of adding the stabilizer, it is preferable to dry the cellulose acetate. The method is not particularly limited, and any known method can be used, for example, drying under conditions such as air supply and decompression can be performed. As the drying method, for example, hot air drying can be mentioned.

Also, after drying cellulose acetate, the cellulose acetate may be pulverized. For the pulverization, it is possible to use a conventional pulverizer, for example, a sample mill, a hammer mill, a turbo mill, an atomizer, a cutter mill, a bead mill, a ball mill, a roll mill, a jet mill, a pin mill, etc. Further, it may be freeze pulverization, dry pulverization at normal temperature, or wet pulverization.

The cellulose acetate of the present disclosure can be formed into a hollow fiber membrane or the like by spinning, and the hollow fiber membrane can be used for RO membrane and FO membrane which are used for production of ultrapure water or desalination of sea water, UF membrane which is used for removing microorganisms or pretreatment for seawater desalination, and the like.

EXAMPLES

Hereinafter, the present invention will be specifically described with reference to examples, but the technical scope of the present invention is not limited by these examples.

Physical properties stated in examples described later were evaluated as follows.

Calcium content and magnesium content, total content of calcium and magnesium, 6 percent viscosity, degree of filtration Kw, molecular weight distribution Mw/Mn, 6-position substitution degree, total sulfuric acid concentration, and half-value width of composition distribution were measured by the above-mentioned methods.

<Degree of Acetylation>

Degree of acetylation was determined by the measurement and calculation method of degree of acetylation described in ASTM-D-817-91 (test method of cellulose acetate, etc.).

Thy cellulose acetate (1.9 g) was precisely weighed and dissolved in 150 mL of a mixed solvent of acetone and dimethyl sulfoxide (volume ratio 4:1), then 30 mL of 1 N aqueous sodium hydroxide solution was added, followed by saponification at 25° C. for 2 hours. Phenolphthalein as an indicator is added to the reaction mixture and excess sodium hydroxide is titrated with 1 N sulfuric acid (concentration factor: F). Further, a blank test is carried out in the same manner as above, and the average degree of acetylation is calculated according to the following formula.

Average degree of acetylation (%)=[6.5×($B-A$)×$F$]/$W$ (In the formula, A is a titration amount (mL) of 1 N sulfuric acid in the sample; B is a titration amount (mL) of 1 N sulfuric acid in the blank test; F is a concentration factor of 1 N sulfuric acid; and W is a weight of the sample.).

<Inner Diameter, Outer Diameter, and Hollowness of Hollow Membrane>

The inner diameter, the outer diameter, and the film thickness of the hollow fiber membranes are obtained by passing a suitable number of hollow fiber membranes through a hole having a diameter of 3 mm in the center of a slide glass to such an extent that the hollow fiber membranes do not fall off through the hole; cutting the hollow fiber membrane with a razor along the upper and lower surfaces of the slide glass to obtain a cross section sample of the hollow fiber membrane; and then measuring the short diameter and long diameter of the cross section of the hollow fiber membrane using a projector Nikon PROFILE PROJECT ORV-12. The short diameter and the long diameter in two directions for each cross section of the hollow fiber membrane are measured; the respective arithmetic mean values of such diameters are taken as the inner diameter and the outer diameter of one hollow fiber membrane cross section; and the film thickness was calculated according to the equation: (outer diameter−inner diameter)/2. Measurements were similarly performed on five cross sections, and the average values were used for inner diameter, outer diameter, and film thickness, respectively. The hollowness (%) was calculated according to the following formula.

Hollowness (%)=(Inner diameter/Outer diameter)$^2$×100(%)

<Dense Layer Thickness>

After washing the hollow fiber membrane with water, the solvent substitution was carried out by dipping the membrane in 2-propanol (Wako Pure Chemical Industries, Ltd.) and cyclohexane (Wako Pure Chemical Industries, Ltd.) in this order at 25° C. for each 1 hour. After the solvent substitution, the hollow fiber membrane was drained and dried for 24 hours in a vacuum dryer (Yamato Vacuum Drying Oven DP 33) having an internal temperature of 50° C. and an internal pressure of −40 Pa. The hollow fiber membrane obtained by drying was embedded in a resin and a section was cut out using a microtome (REICHERT-NISSEI ULTRACUT) so that the cross section of the hollow fiber membrane could be observed. The cut section was observed with a differential interference microscope (OPII-PHOT mirror base, manufactured by Nikon Corporation, a reflection type differential interference apparatus NR). From the obtained microscopic image, the thicknesses of the dense layer at 10 points were measured, and the average value thereof was taken as a dense layer thickness.

<Water Permeability>

After bundling hollow fiber membranes and inserting them into a plastic sleeve, a thermosetting resin was injected into the sleeve, cured, and sealed. An end face of the hollow fiber membrane cured with the thermosetting resin was cut to obtain an opening face of the hollow fiber membrane, thereby to obtain an evaluation module having a membrane area of about 0.1 m$^2$ based on the outer diameter. This evaluation module was connected to a membrane performance testing apparatus including a supply water tank and a pump, and then the water permeability was evaluated.

A feed aqueous solution having a sodium chloride concentration of 1500 mg/L was filtered from the outside to the inside of the hollow fiber membrane at 25° C. and a pressure of 1.5 MPa for 1 hour. Thereafter, permeated water was collected from the opening face of the hollow fiber membrane, and the amount of permeated water was measured with an electronic balance (METTLER TOLEDO PG 5002-S Delta Range). The water permeability was calculated from the following formula:

Water permeability (L/m$^2$/day)=Permeated water volume (L)/Membrane area (m$^2$) based on outer diameter/Time taken for membrane permeated water (sampling time) (minutes)×(60 (minutes)× 24 (hours))

<Salt Rejection>

Sodium chloride concentration was measured with an electric conductivity meter (CM-25R, manufactured by DKK-TOA Corporation) from membrane permeated water collected in the evaluation of water permeability and a feed aqueous solution having a sodium chloride concentration of 1500 mg/L used in the evaluation of water permeability. The salt rejection was calculated from the following formula.

Salt rejection (%)=(1−Membrane permeated salt concentration (mg/L)/Salt concentration of feed aqueous solution (mg/L))×100

Example 1

Hardwood prehydrolyzed kraft pulp having an α-cellulose content of 98.4% by weight and a carboxyl group content of 1.1 to 2.5 meq/100 g was crushed into cotton-like pulp with a disc refiner. Then, 33 parts by weight of acetic acid kept at 25° C. was sprayed onto 100 parts by weight of the crushed pulp (moisture content: 7.0%), and the resulting mixture was well stirred and was then allowed to stand for 2 hours for activation as pretreatment (activation step).

As an esterification step, the pulp activated by the pretreatment was added to a mixed solution consisting of 364 parts by weight of acetic acid, 244 parts by weight of acetic anhydride, and 6.6 parts by weight of concentrated sulfuric acid. The mixed solution was previously cooled to 8.9° C. below freezing. Based on the time point when the pulp was added to the mixed solution, it took 48 minutes to adjust to a peak temperature of from 8.9° C. below freezing to 50.9° C. below freezing, and after 65 minutes the temperature was lowered by 5° C. from the peak temperature. After 152 minutes from the pulp was added to the mixed solution a neutralizing agent (24% by weight magnesium acetate) was started to add so that the sulfuric acid amount (ripening sulfuric acid amount) was adjusted to 3.7 parts by weight, thereby to complete the esterification step. Further, as a hydrolysis step, the reaction bath was heated to 50.9° C. and hydrolysis reaction was carried out for 50 minutes. The hydrolysis reaction was stopped by neutralizing sulfuric acid with magnesium acetate to obtain a reaction mixture containing cellulose acetate. The time from adding the pulp to the mixed solution until adding the neutralizing agent is defined as an esterification time.

100 parts by weight of the reaction mixture containing cellulose acetate was treated with about 300 parts by weight of a 10% dilute aqueous acetic acid solution to give a precipitate. After washing the precipitate with water, calcium hydroxide was added as a stabilizer, and the mixture was filtered and dried to obtain cellulose acetate. The results of measuring the physical properties of the obtained cellulose acetate are shown in Table 1.

44 parts by weight of the obtained cellulose acetate, 47.3 parts by weight of 1-methyl-2-pyrrolidone (NMP, Wako Pure Chemical Industries, Ltd.), 8.4 parts by weight of ethylene glycol (EC Wako Pure Chemical Industries, Ltd.), 0.3 parts by weight of benzoic acid (NACALAI TESQUE, INC.) were dissolved under heating conditions of 180° C. to obtain a membrane-forming stock solution. After the obtained membrane-forming stock solution was defoamed under reduced pressure, it was discharged from an arc type nozzle into a space blocked from outside air at 163° C., and immersed, after about 0.03 seconds, in a coagulation solution of 7° C. consisting of NMP/EG/water=4.25/0.75/95.0 (parts by weight) to form a hollow fiber membrane. Subsequently, the hollow fiber membrane was washed, immersed in water at 60° C. in a wet state, and annealing was carried out. The obtained hollow fiber membrane had an inner diameter of 90 μm, an outer diameter of 150 μm, and a hollowness of 36.0%.

An evaluation module having a length of 1000 mm was produced using the obtained hollow fiber membrane, so that the water permeability (L/m$^2$/day) and the salt rejection (%) were measured. The results are shown in Table 1.

Examples 2 to 4 and Comparative Examples 1 to 9

Cellulose acetate was obtained in the same manner as in Example 1 except that the conditions were changed as shown in Table 1. The results of measuring the physical properties of the obtained cellulose acetate are shown in Table 1.

Next, using the obtained cellulose acetate, a hollow fiber membrane was obtained in the same manner as in Example 1 to prepare an evaluation module, with which the permeability (L/m$^2$/day) and the salt rejection (%) were measured. The results are shown in Table 1. However, in Comparative Example 7, measurement was not carried out because the hollow fiber membrane could not be produced.

Comparative Example 10

Cellulose acetate obtained in Example 3 and cellulose acetate obtained in Comparative Example 1 were mixed in a weight ratio of 2:1 to obtain cellulose acetate. The results of measuring the physical properties of the obtained cellulose acetate are shown in Table 1.

Next, using the obtained cellulose acetate, a hollow fiber membrane was obtained in the same manner as in Example 1 to prepare an evaluation module, with which the permeability (L/m$^2$/day) and the salt rejection (%) were measured. The results are shown in Table 1.

TABLE 1

| | | | Example 1 | Example 2 | Example 3 | Example 4 | Comparative example 1 | Comparative Example 2 | Comparative example 3 | Comparative example 4 | Comparative example 5 | Comparative Example 6 | Comparative example 7 | Comparative example 8 | Comparative Example 9 | Comparative example 10 |
|---|---|---|---|---|---|---|---|---|---|---|---|---|---|---|---|---|
| Raw material | Pulp | Kind | Pulp | Pulp | Pulp | Pulp | Pulp | Cotton linter | Pulp | Cotton linter | Pulp | Pulp | Pulp | Cotton linter | Pulp | Pulp |
| | | Carboxyl group content (meq/100 g) | 1.1–2.5 | 1.1–2.5 | 1.1–2.5 | 1.1–2.5 | 1.1–2.5 | About 0.8 | 1.1–2.5 | About 0.8 | 1.1–2.5 | 1.1–2.5 | 1.1–2.5 | About 0.8 | 1.1–2.5 | 1.1–2.5 |
| Pretreatment step | | (Parts by weight) | 100 | 100 | 100 | 100 | 100 | 100 | 100 | 100 | 100 | 100 | 100 | 100 | 100 | — |
| | Acetic acid | (parts by weight) | 33 | 33 | 30 | 33 | 33 | 43 | 33 | 47 | 30 | 47 | 33 | 33 | 33 | — |
| Esterification step | Mixed solution | Acetic acid (parts by weight) | 364 | 364 | 361 | 357 | 354 | 386 | 354 | 421 | 361 | 452 | 364 | 357 | 357 | — |
| | | Acetic anhydride (parts by weight) | 244 | 244 | 244 | 242 | 239 | 279 | 239 | 285 | 244 | 285 | 244 | 242 | 242 | — |
| | | Concentrated sulfuric acid (parts by weight) | 6.6 | 6.6 | 7.1 | 6.6 | 6.6 | 9.9 | 6.6 | 7.1 | 6.6 | 7.9 | 6.6 | 6.6 | 6.6 | — |
| | Temperature/ Time of reaction system | Temperature (°C) | −8.9 | −8.9 | −8.3 | −7.2 | −11.2 | −12.4 | −11.4 | −11.3 | −11.0 | −8.7 | −5.2 | −8.9 | −5.8 | — |
| | | Peak time (min) | 48 | 46 | 46 | 44 | 60 | 62 | 64 | 86 | 58 | 70 | 40 | 47 | 42 | — |
| | | Peak temperature (°C) | 50.9 | 52.5 | 52.1 | 54.2 | 47.2 | 38.0 | 45.7 | 42.1 | 47.5 | 39.0 | 56.9 | 51.8 | 55.4 | — |
| | | Time to drop by 5°C than peak temperature (min) | 65 | 65 | 64 | 62 | 80 | — | 86 | 126 | 87 | — | 56 | 66 | 60 | — |
| | | Esterification time (min) | 152 | 159 | 152 | 98 | 159 | 126 | 164 | 166 | 116 | 207 | 109 | 157 | 87 | — |
| Hydrolysis step | | Temperature (°C) | 50.9 | 51.6 | 60.0 | 61.2 | 48.0 | 50.0 | 49.5 | 60.5 | 46.0 | 57.0 | 51.0 | 51.5 | 61.1 | 105.3 |
| | | Time (min) | 50 | 50 | 55 | 50 | 50 | 110 | 50 | 106 | 50 | 70 | 50 | 50 | 50 | 11.6 |
| Properties of cellulose acetate | | Calcium content (ppm) | 110.1 | 115.0 | 103.0 | 114.2 | 113.8 | 76.4 | 105.5 | 74.8 | 90.7 | 97.5 | — | 72.4 | 103.2 | — |
| | | Magnesium content (ppm) | 6.0 | 6.0 | 12.9 | 7.8 | 7.4 | 2.2 | 6.2 | 1.7 | 16.8 | 5.2 | — | 2.3 | 9.9 | — |
| | | Total content of calcium and magnesium (μmol/g) | 2.99 | 3.11 | 3.10 | 3.17 | 3.14 | 2.00 | 2.89 | 1.94 | 2.95 | 2.65 | — | 1.90 | 2.98 | 3.10 |
| | | 6% Viscosity (mPa·s) | 62 | 56 | 48 | 65 | 93 | 125 | 118 | 94 | 88 | 63 | — | 64 | 52 | 62 |
| | | Molecular weight distribution Mw/Mn | 2.805 | 2.819 | 2.815 | 2.782 | 2.800 | 2.768 | 2.782 | 2.789 | 2.801 | 2.802 | — | 2.778 | 2.771 | 3.384 |
| | | Degree of filtration Kw (g⁻¹) | 17 | 15 | 12 | 28 | 24 | 32 | 26 | 23 | 16 | 22 | — | 15 | 38 | 14 |
| | | Half-value width of composition distribution (%) | 135 | 88 | 94 | 112 | 130 | 73 | 118 | 74 | 306 | 104 | — | 90 | 98 | 102 |
| | | Total sulfuric acid concentration (ppm) | 61.69 | 61.73 | 61.78 | 61.62 | 61.64 | 61.21 | 61.62 | 61.71 | 61.65 | 62.11 | — | 61.7 | 61.57 | 61.74 |
| | | Degree of acetylation (%) | 0.925 | 0.874 | 0.893 | 0.902 | 0.887 | 0.895 | 0.913 | 0.854 | 0.892 | 0.917 | — | 0.898 | 0.902 | 1.034 |
| | | 6-Position substitution degree (%) | 0.945 | 0.947 | 0.942 | 0.941 | 0.945 | 0.903 | 0.942 | 0.938 | 0.944 | 0.962 | — | 0.945 | 0.935 | 0.943 |
| Hollow fiber membrane | | Inner diameter (μm) | 90 | 90 | 88 | 90 | 100 | 95 | 100 | 100 | 100 | 90 | — | 90 | 90 | 92 |
| | | Outer diameter (μm) | 150 | 145 | 140 | 150 | 175 | 200 | 190 | 175 | 175 | 150 | — | 150 | 145 | 150 |
| | | Hollowness (%) | 36.0 | 38.5 | 39.5 | 36.0 | 32.7 | 22.6 | 27.7 | 32.7 | 32.7 | 36.0 | — | 36.0 | 38.5 | 37.6 |
| | | Dense layer thickness (μm) | 1 | 1 | 1 | 1 | 2 | 4 | 3 | 2 | 2 | 1 | — | 1 | 1 | 1 |
| Performance | | Water permeability (L/m²/day) | 330 | 340 | 360 | 310 | 270 | 220 | 240 | 240 | 270 | 290 | — | 260 | 220 | 290 |
| | | Salt rejection (%) | 97 | 98 | 97 | 96 | 98 | 93 | 98 | 86 | 97 | 93 | — | 84 | 82 | 94 |

The invention claimed is:

1. A cellulose acetate, wherein:
a total content of calcium and magnesium is 2.8 to 3.5 μmol/g;
a 6 percent viscosity is 40 to 80 mPa·s;
a degree of filtration Kw is 35 $g^{-1}$ or less;
a molecular weight distribution Mw/Mn is 3.00 or less; and
a degree of acetylation is 61.3 to 62.3%.

2. The cellulose acetate according to claim 1, wherein the degree of filtration Kw is 30 $g^{-1}$ or less.

3. The cellulose acetate according to claim 1, wherein a calcium content is 80 to 200 ppm.

4. The cellulose acetate according to claim 1, wherein a half-value width of composition distribution is 1.0% or less.

5. The cellulose acetate according to claim 1, wherein a 6-position substitution degree is 0.92 or more.

6. The cellulose acetate according to claim 1, wherein a total sulfuric acid concentration is 40 to 150 ppm.

* * * * *